United States Patent
Habiba et al.

(10) Patent No.: US 12,388,708 B2
(45) Date of Patent: Aug. 12, 2025

(54) REAL-TIME ADJUSTMENT AND DEPLOYMENT OF REGULATORY POLICIES

(71) Applicant: International Business Machines Corporation, Armonk, NY (US)

(72) Inventors: Mansura Habiba, Jhonstown (IE); Fernando Luiz Koch, Palm Beach Gardens, FL (US); Alecio Pedro Delazari Binotto, Munich (DE); Rafflesia Khan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/401,923

(22) Filed: Jan. 2, 2024

(65) Prior Publication Data

US 2025/0219902 A1 Jul. 3, 2025

(51) Int. Cl.
*H04L 41/0813* (2022.01)

(52) U.S. Cl.
CPC .................. *H04L 41/0813* (2013.01)

(58) Field of Classification Search
CPC ......... H04L 41/0813; G06F 9/38; G06F 9/48; G06F 9/50
USPC ....................................................... 709/221
See application file for complete search history.

(56) References Cited

U.S. PATENT DOCUMENTS

| 10,262,019 | B1 | 4/2019 | Reiner |
| 2020/0142735 | A1* | 5/2020 | Maciocco ............. H04L 9/0825 |
| 2023/0135882 | A1 | 5/2023 | Cella |
| 2023/0275930 | A1 | 8/2023 | Ghosh |

FOREIGN PATENT DOCUMENTS

CN 114779657 A 7/2022

OTHER PUBLICATIONS

Liang et al., "Multi-access Edge Computing Fundamentals, Services, Enablers and Challenges: A Complete Survey", Journal of Network and Computer Applications, Dec. 2021, DOI: 10.1016/j.jnca.2021.103308, 27 pages.

* cited by examiner

*Primary Examiner* — Glenford J Madamba
(74) *Attorney, Agent, or Firm* — Michael A. Petrocelli

(57) ABSTRACT

Embodiments of the present invention provide computer-implemented methods, computer program product, and computer systems. One or more processors, collect information associated with a target edge platform. The one or more processors, generate a set of rules for a target edge platform for different situations that can occur on the target edge platform. The one or more processors in response to receiving additional information, dynamically adjust the generated set of rules for the target platform.

20 Claims, 6 Drawing Sheets

REAL-TIME ADJUSTMENT AND DEPLOYMENT OF REGULATORY POLICIES

BACKGROUND

The present invention relates generally to the multi-access edge computing, and more particularly to management of multi-access edge computing policies and deployment.

Multi-access edge computing (MEC) typically refers to a type of network architecture that provides cloud computing capabilities. In general, the goal of MEC is to reduce latency, ensure highly efficient network operation and service delivery, and improve the customer experience. Cloud services and edge computing to move application hosts away from a centralized datacenter to the edge of the network, resulting in applications that are closer to end users and computing services that are closer to application data. Edge application services reduce the volumes of data that must be moved, the consequent traffic, and the distance that data must travel. That provides lower latency and reduces transmission costs.

Computation offloading is a mechanism that can be used in multi-access edge computing that transfers resource intensive computational tasks to a separate processor such as a hardware accelerator or an external platform (e.g., cluster, grid, cloud, etc.). Typical applications that benefit from computation offloading include image rendering and mathematical calculations.

SUMMARY

According to an aspect of the present invention, there is provided a computer-implemented method, a computer program product, and a computer system. The computer-implemented method includes collecting information associated with a target edge platform. The computer-implemented method further includes generating a set of rules for a target edge platform for different situations that can occur on the target edge platform. The computer-implemented method further includes in response to receiving additional information, dynamically adjusting the generated set of rules for the target platform.

The computer program product includes one or more computer readable storage media and program instructions stored on the one or more computer readable storage media. The program instructions include program instructions to collect information associated with a target edge platform. The program instructions further include program instructions to generate a set of rules for the target edge platform for different situations that can occur on the target edge platform. The program instructions further include program instructions to, in response to receiving additional information, dynamically adjust the generated set of rules for the target platform.

The computer system includes one or more computer processors, one or more computer readable storage media, and program instructions stored on the one or more computer readable storage media for execution by at least one of the one or more computer processors. The program instructions include program instructions to collect information associated with a target edge platform. The program instructions further include program instructions to generate a set of rules for the target edge platform for different situations that can occur on the target edge platform. The program instructions further include program instructions to, in response to receiving additional information, dynamically adjust the generated set of rules for the target platform.

BRIEF DESCRIPTION OF THE DRAWINGS

Preferred embodiments of the present invention will now be described, by way of example only, with reference to the following drawings, in which.

DETAILED DESCRIPTION

Figure 1:
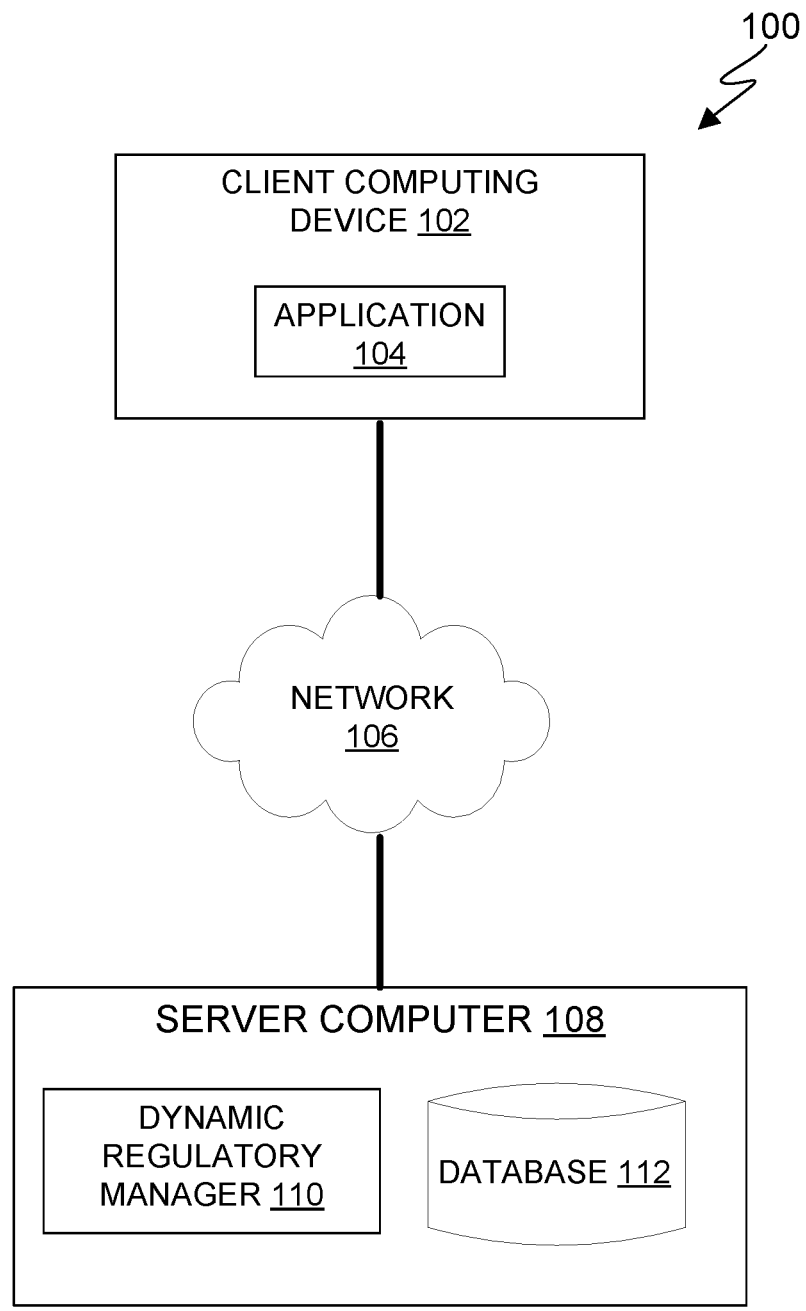
FIG. 1 depicts a block diagram of a computing environment, in accordance with an embodiment of the present invention.

Embodiments of the present invention recognize certain deficiencies over existing computational processing. For example, existing solutions pre-define rules, however embodiments of the present invention recognize that changes to environment may generate scenarios that create inefficiencies because the pre-define rules were not written to address that specific scenario. In some instances, existing solutions may mark the changed scenario as an invalid scenario and the entire platform because invalid until a pre-defined scenario is implemented. Embodiments of the present invention provide solutions that can dynamically adapt to changing conditions by creating new rules and executing workflows for changing conditions.

Typically, computational offloading refers to selectively transfer computation tasks from the core cloud data center to edge servers and devices. Embodiments of the present invention further recognize that computation offloading requires a series of decisions regarding computation offloading are considered, including whether to offload, how much to offload, what to offload, when to offload, where to offload, which computation offloading policy can be used, and what is the best offloading policy. Embodiments of the present invention recognizes that these decisions require up to date information and typical solutions can struggle adapting to changing conditions. Thus, embodiments of the present invention can dynamically adapt to changing conditions by creating new rules and executing workflows for changing conditions. More specifically, embodiments of the present invention can create a power-aware workload deployment and migration based on multiple objectives can help adjust deployment patterns based on multiple objectives to achieve certain sustainable key performance indicators.

For example, devices on edge locations are mobile and continuously changing due to hundreds of continuously changing parameters of the context. Embodiments of the present invention further recognize that topology of devices connected to the network can change in a short time. Embodiments of the present invention can classify changes to conditions of a network, adjust existing policies for newly encountered conditions, and assess the impact of new rules generated and executed to address the newly encountered conditions. For example, as new conditions arise (e.g., situation S1), embodiments of the present invention can identify a problem with Edge Location 1 (E1) and generate rules and execute them to move workloads and services associated with Edge Location 1 to a new location Edge location 2 (E2). In this manner, as described in greater detail later in the specification, embodiments of the present invention can collect information associated with a target edge platform, generate a set of rules for a target edge platform for different situations that can occur on the target edge platform; and in response to receiving additional information, dynamically adjust the generated set of rules for the target platform.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access dynamic regulatory manager 110 (e.g., using TCP/IP) to access network information. Application 104 can further communicate with dynamic regulatory manager 110 to capture and classify contextual information and adjust existing policies for newly encountered situations, as discussed in greater detail in FIGS. 2-5.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts dynamic regulatory manager 110 and database 112. In this embodiment, dynamic regulatory manager 110 resides on server computer 108. In other embodiments, dynamic regulatory manager 110 can have an instance of the program (not shown) stored locally on client computing device 102. In other embodiments, dynamic regulatory manager 110 can be a standalone program or system that can be integrated in one or more computing devices having a display screen.

Dynamic regulatory manager 110 provides a management mechanism that can run in a cloud environment for a target edge platform that can generate or adjust configuration rules, policies, and deployment patterns during run time operations. In multi-access edge computing (MEC), deployment patterns can be used to process and render augmented reality (AR) and virtual reality (VR) content at the edge, reducing latency and improving the user experience. For example, in a sports stadium, MEC servers at the edge can deliver real-time player statistics, replays, and interactive AR/VR experiences to fans' mobile devices. Deployment patterns can include that the MEC can support edge gaming platforms, reducing latency and enabling multiplayer gaming experiences. For example, MEC servers at edge data centers can host multiplayer game servers, providing low-latency interactions for gamers. The MEC can enhance emergency response by processing data from various sensors and communication devices at the edge. For example, MEC servers in public safety vehicles can process video feeds, coordinate responses, and provide real-time data to first responders. Examples of different deployment patterns include some servers in edge locations are used for gaming platforms, however, during a natural disaster, there would exist a need to use the same servers for broadcasting video recording of a certain area. In this example, the same resources need to integrate with a different deployment pattern. Based on the priority of use, security and others, dynamic regulatory manager 110 can integrate the different components on the fly. In the aftermath of a natural disaster, dynamic regulatory manager 110 can deploy mobile MEC units to affected areas. This can change the policy for network topology. The regular load balancing protocol and policies need to be changed due to the implementation of adaptive load balancing during disaster response and variable workload-based platform. Dynamic regulatory manager 110 can further align the demands of a workload and can update processes to adjust a dynamically changed scenario to different edge locations.

In this embodiment, dynamic regulatory manager 110 can capture and classify changes to conditions of a network, adjust existing policies for newly encountered conditions, and assess the impact of new rules generated and executed to address the newly encountered conditions (i.e., situations). Conditions of a network refers to a state of the network regarding performance. Examples of conditions include contextual parameters (i.e., contextual information) that changes the functioning of a network (e.g., edge location goes offline, changes to network topology, device settings, network parameters, other environmental situations, etc.), weights associated with each respective contextual parameters and target outputs/outcomes (i.e., policies, goals, compliance targets, etc.). Examples of contextual parameters can further include the number of nodes in the network topology, the threshold for network latency, the threshold for retries in case of failed network connectivity, the threshold of the prefix in the direct link or similar private connection, the number of applications running at a certain time of the day (i.e., time to live, TTL) for caching and others.

In this embodiment, dynamic regulatory manager 110 collects context aware parameters for all edge applications of the platform, network topology, environment policies, device settings of devices connected to the platform, and can store that information in a central data storage such as database 112. Dynamic regulatory manager 110 can generate a set of rules for different parameters, topologies, policies and settings. Dynamic regulatory manager 110 can then store and classify the generated rules and organize them in a catalog.

Dynamic regulatory manager 110 can adjust existing rules or derive a new set of rules and policies for a newly encountered condition. For example, in response to receiving information about a particular edge location being offline (e.g., a new condition/situation), dynamic regulatory manager 110 can generate rules and subsequently execute those rules to transfer services and applications from the offline edge location to another edge location within the network. Dynamic regulatory manager 110 can then assess the impact and effectiveness of the generated, context aware rules for the new conditions at the edge platform against a pre-defined threshold. Dynamic regulatory manager 110 can continuously learn through reinforcement and generative artificial intelligence model in an iterative manner to continuously monitor, assess, and reinforce learning of adjusted rules, policies, and deployment patterns. In certain embodiments, dynamic regulatory manager 110 can predict new scenarios and generate corresponding rules and policies before deploying solutions. In this embodiment, a solution includes an adjustment of existing rules, generated rules for predicted new scenarios, and corresponding policies. In certain embodiments, a solution can include a selection of and subsequent deployment of one or more edge applications for a respective, predicted new scenario. As used herein, a scenario refers to a set of conditions that are associated with respective rules and policies. In certain cases, a scenario can refer to a set of conditions for a specific location comprising one or more edge applications. For example, a scenario can include an interruption of service to one or more edge applications due to a natural disaster.

Database 112 stores received network information such as received context aware parameters, network topology, environment policies, device settings, etc. For example, database 112 can be implemented with a tape library, optical library, one or more independent hard disk drives, or multiple hard disk drives in a redundant array of independent disk (RAID). In this embodiment database 112 is stored on server computer 108.

Figure 2:
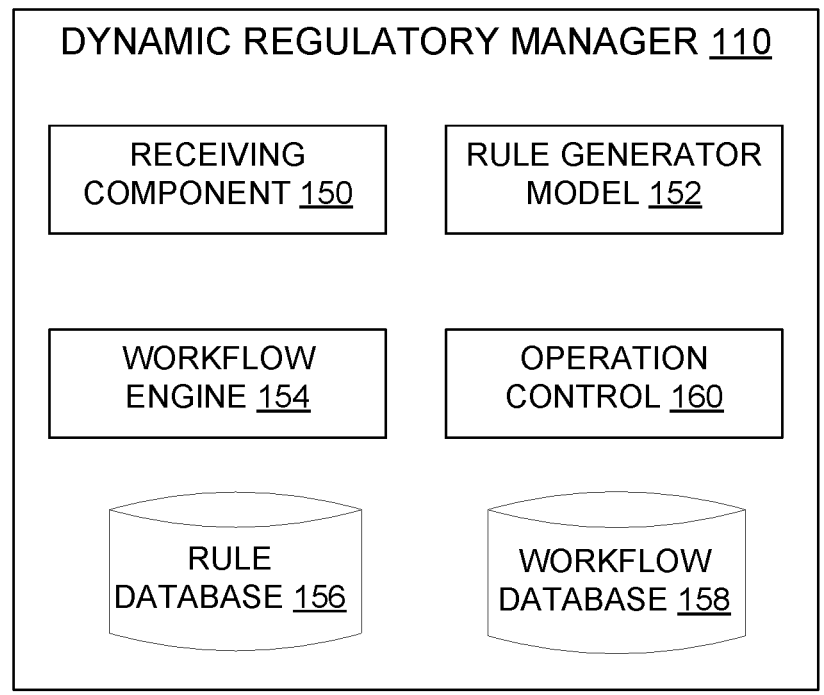
FIG. 2 depicts a block diagram of certain components of a dynamic regulatory manager, in accordance with an embodiment of the present invention.

FIG. 2 depicts a block diagram of certain components of a dynamic regulatory manager, in accordance with an embodiment of the present invention.

Dynamic regulatory manager 110 includes receiving component 150, rule generator model 152, workflow engine 154, rule database 156, workflow database 158 and operation control 160. In this embodiment, receiving component 150 receives changes in conditions of a network and connected devices (e.g., context-aware parameters). In other embodiments, receiving component 150 can query each connected device according to a schedule to receive changes in network conditions. Rule generator model 152 can generate rules and policies in response to receiving changing conditions that affect a network. Workflow engine 154 creates workflows for generated, and stored rules. Workflow engine 154 can adjust created workflows based on effectiveness of the generated rules. Operation control 160 executes generated rules and associated workflows.

Rules database 156 and workflow database 158 stores created rules and associated workflows respectively. For example, database 112 can be implemented with a tape library, optical library, one or more independent hard disk drives, or multiple hard disk drives in a redundant array of independent disk (RAID).

Figure 3:
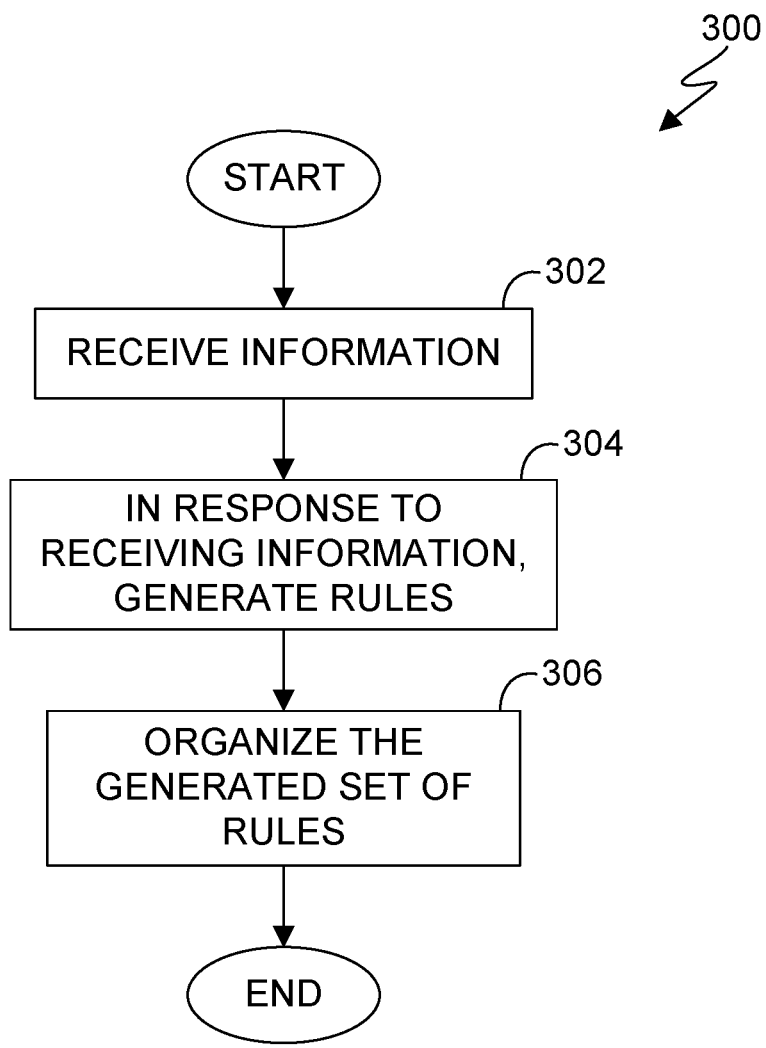
FIG. 3 is a flowchart depicting operational steps for capturing and classifying rules and associated context for those rules for a target platform, in accordance with an embodiment of the present invention.

FIG. 3 is a flowchart 300 depicting operational steps for capturing and classifying rules and associated context for those rules, in accordance with an embodiment of the present invention.

In step 302, dynamic regulatory manager 110 receives information. In this embodiment, dynamic regulatory manager 110 receives information from client computing device 102 (e.g., an edge device connected to network 106. In other embodiments, dynamic regulatory manager 110 can actively capture and collect information by querying respective devices connected to the network or otherwise recognized as part of the network topology. For example, dynamic regulatory manager 110 can collect information comprising context aware parameters for all edge applications, network topology, environment policies, and device settings associated with a target edge platform. In yet other embodiments, dynamic regulatory manager 110 can receive information from one or more other components of computing environment 100. In this embodiment, received information includes context aware parameters, network topology, environment policies, device settings, etc.

In step 304, dynamic regulatory manager 110 generates a set of rules for different situations. In this embodiment, in response to receiving information, dynamic regulatory manager 110 generates a set of rules for different situations based on the received information (e.g., different parameters, topology, policies and settings). Each rule includes a workflow represented by a set of tasks in a sequence that can be performed by one or more actions. Each action is represented a s tuple of <Input (i), Operations (Ops), and Output (O)>. In this embodiment, dynamic regulatory manager 110 considers every rule as r£VR* as a tuple of <C, W, and TP>, expressed by formula 1 below:

$$r = \langle C, W, \text{ and } TP \rangle \qquad \text{Formula 1}$$

where C is a context parameter, W is the weight for each of those parameters and TP represents the target output expressed.

In this embodiment, dynamic regulatory manager 110 uses a supervised and reinforcement learning to train a model that can detect different rules for different sets of context parameters, the weight for each of those parameters and target outputs. Once the model runs on different sets of C, TP, and W, dynamic regulatory manager 110 can create a rule database.

In step 306, dynamic regulatory manager 110 organizes the generated set of rules. In this embodiment, dynamic regulatory manager 110 can organize the generated set of rules by relation. In other words, dynamic regulatory manager 110 can identify relation between rules, task, and actions which is expressed as a tuple <Relation profile R, t, and a>, where "r" represents rule, "t" represents task, and "a" represents action. In other embodiments, dynamic regulatory manager 110 organizes the generated set of rules according to topology. For example, parameters for a specific topology are grouped together and organized based on policies and settings. New rules or additional received parameters can be organized according to similarity to existing groupings. For example, new rules may be stored as a subset of rules for a particular topology.

Figure 4:
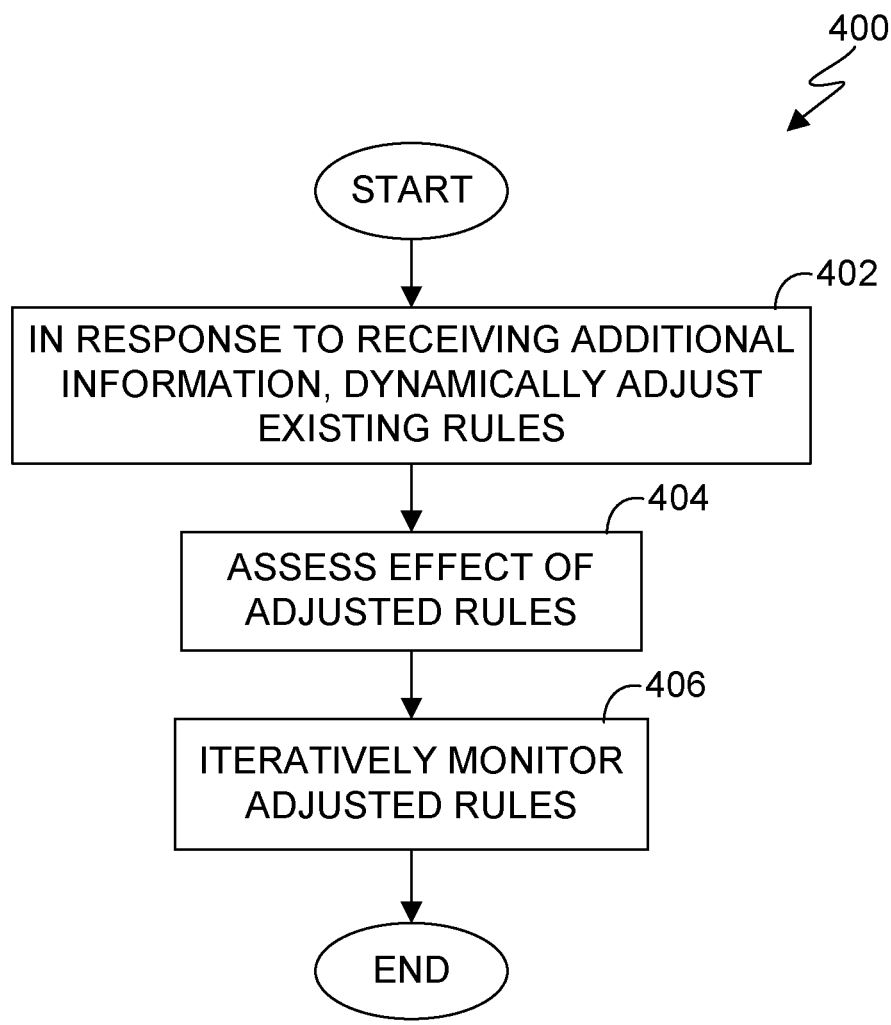
FIG. 4 is a flowchart depicting operational steps for dynamically adjusting and deploying new rules, in accordance with an embodiment of the present invention.

FIG. 4 is a flowchart 400 depicting operational steps for dynamically adjusting and deploying new rules, in accordance with an embodiment of the present invention.

In step 402, dynamic regulatory manager 110, in response to receiving additional information, dynamic regulatory manager 110 dynamically adjusts existing rules. In this embodiment, additional information can include a new request or changes to network topology (i.e., updates from one or more components of computing devices connected to the network). In this embodiment, a request can include a new task, associated context parameters, weights for each of the received context parameters, target outputs. Updates can include changes to network topology or variations of environmental situations which can result in less-than-optimal performance of current management rules. Other examples of updates (i.e., additional information) can include latency for network request application response time, threshold for caching, and network fault tolerance for different applications. For example, if an application has a rule specifying when a threshold number of unsuccessful attempts to establish a network connection (e.g., five unsuccessful retry to establish a network connection), the application will fail and result in an error situation. In this example, due to some disaster situations, the network latency has deviated from normal operating parameters (e.g., slowed down) and it requires more retries to have a successful operation execution. Dynamic regulatory manager 110 can receive this additional information as an update (e.g., this number of retries in the application in case of a failed network connectivity can be considered as additional information or context parameters) and adjust existing rules to account for the updated information.

Another example of additional information can include an update for computation times exceeding what would be considered as normal, the time of day when the system experiences heavy computation demands. For example, existing rules can specify that normal computation cannot tolerate the network latency of 20 milliseconds and can further specify that the application does not failover in these conditions. Dynamic regulatory manager 110 can receive an update that the system is experience heavy computation running at a particular time of the day and reconcile this update with the existing rule that the application cannot tolerate 20 milliseconds of network latency. In this circumstance, dynamic regulatory manager 110 can create a new rule and initiate a failover mechanism.

In another example, in response to receiving a new request, dynamic regulatory manager 110 can reference the rule database to determine whether an existing rule in the rule database matches parameters (i.e., context parameters, target outputs, etc.) of the received request. In response to determining that an existing rule in the rule database matches parameters (i.e., context parameters, target outputs, etc.) of the received request, dynamic regulatory manager 110 can execute the existing rule.

In some instances, dynamic regulatory manager 110 can receive updates that creates scenarios where a specific rule is not applicable or application of the specific rule results in an inefficient use of resources. In other words, in some instances, dynamic regulator manager 110 can determine that an existing rule cannot address the received changes. In this circumstance, dynamic regulatory manager 110 can dynamically adjust the generated set of rules to address the received updates by identifying difference between current and new conditions, generating a new rule and associated workflow, and subsequently deploying and executing the generated rule as discussed in greater detail with respect to FIG. 5.

In step 404, dynamic regulatory manager 110 assesses the effect of adjusted rules. In this embodiment, dynamic regulatory manager 110 assesses the effect of adjusted rules after those rules have been deployed for a particular length of time and then compares the effect of the adjusted rules against a predefined threshold for performance. For example, dynamic regulatory manager 110 can collect results and reinforcement learning expressed as <Rules R*×S*×TP>, where Rules R* represents the rules, S* represents the new situation (i.e., change) and TP represents the new topology created as a response to the new situation.

In some embodiments, dynamic regulatory manager 110 can generate simulations of the created rule in a test environment using digital twin simulation prior to deploying the created rule and associated workflow. In this way, dynamic regulatory manager 110 can measure the effect of the generated rule and associated workflow before deploying the created rule in a live environment. In certain instances, dynamic regulatory manager 110 can refine the generated rule and iteratively run simulations to determine which generated rule produces an optimal result that satisfies context parameters, policies, and existing network topology.

In other embodiments, dynamic regulatory manager 110 can deploy the rules in a live environment under certain conditions (e.g., pre-defined length of time, policies, etc.). Dynamic regulatory manager 110 can revert to a previous rule or configuration if operation metrics yield declining results. For example, dynamic regulatory manager 110 can deploy a created rule for a thirty-minute window. During the thirty-minute window, dynamic regulatory manager 110 assesses the performance of the created rule from the measured baseline (e.g., 80% efficiency) and measures an 60% efficiency in performance for the created rule (e.g., a twenty percent decline in efficiency). In response to identifying a decrease in performance, dynamic regulatory manager 110 can revert to a previous rule for the encountered scenario.

In other embodiments, dynamic regulatory manager 110 can evaluate the impact of the change in rules by simulating the change rules in a simulated network platform and evaluating the impact of the change based on that simulation. Dynamic regulatory manager 110 can also leverage different edge technologies and algorithms to evaluate the impact of the change. For example, in an edge environment, the applications are designed to tolerate X % of the threshold for latency, if the new scenario cannot achieve X as the threshold for latency, dynamic regulatory manager 110 recognizes that the rules need to be readjusted and changed. Using large language models (LLM), machine learning, or other simulation technology, dynamic regulatory manager 110 can replicate the flow of the data and put this new role to validate the data flow as well as latency.

In step 406, dynamic regulatory manager 110 iteratively monitors adjusted rules. In this embodiment, dynamic regulatory manager 110 iteratively monitors adjusted rules according to a predefined interval. For example, dynamic regulatory manager 110 can monitor adjusted rules every day. In other embodiments, dynamic regulatory manager 110 can monitor the adjusted rules according to any predefined interval of time. In this manner, dynamic regulatory manager 110 can create a system that can learn the rules for different context parameters and desire outcomes using the model and create new rules automatically to adapted to new context parameters.

Figure 5:
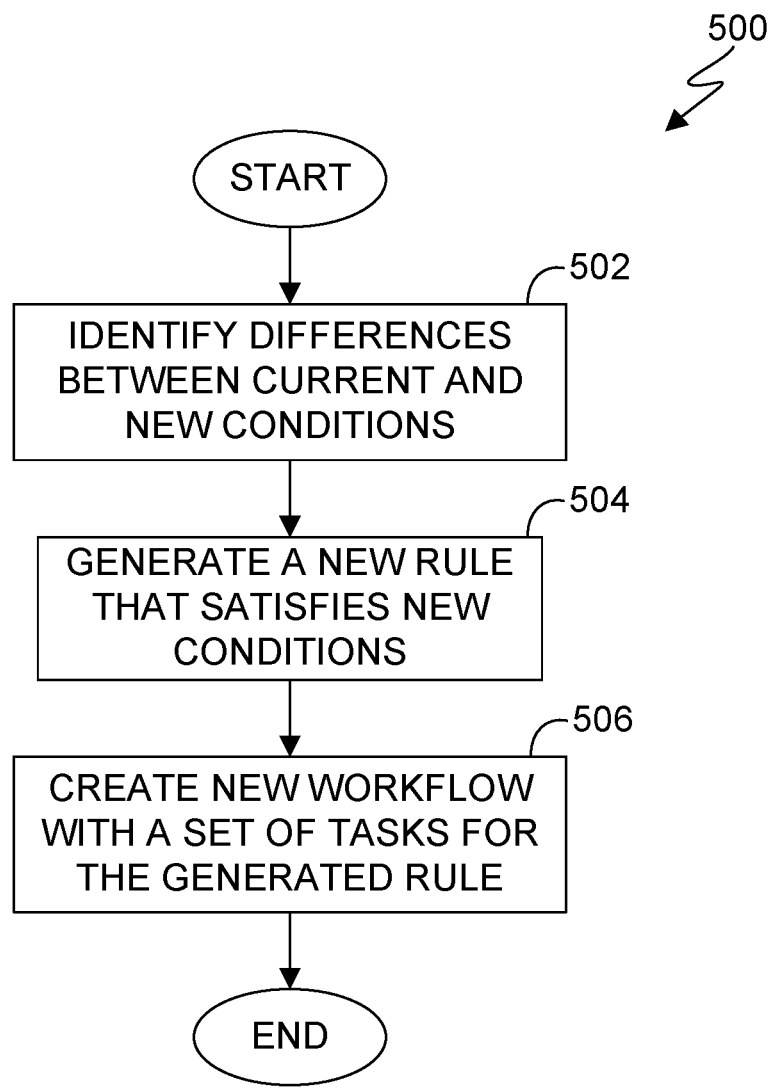
FIG. 5 is a flowchart depicting operational steps for dynamically creating a new rule and associated workflows, in accordance with an embodiment of the present invention.

FIG. 5 is a flowchart 500 depicting operational steps for dynamically creating a new rule and associated workflows, in accordance with an embodiment of the present invention.

In step 502, dynamic regulatory manager 110 identifies differences between current and new conditions. In this embodiment, in response to determining that a received request or update does not have a corresponding rule that matches the received request, dynamic regulatory manager 110 can identify gaps (i.e., differences) in rules for the new scenario and the changed topology and accordingly generate new rules to address the new scenario and changed topology. For example, dynamic regulatory manager 110 can receive an update from one or more components of computing devices connected to the network. The update specifies that edge computing device one has experienced a failure and all current services running on that edge computing device needs to migrate to another edge computing device two because of proximity to edge computing device one. Dynamic regulatory manager 110 can identify the differences between edge computing device one and two and identifies that the central processing unit (CPU), power, and memory of edge computing device two are not the same as edge computing device one.

In step 504, dynamic regulatory manager 110, generate a new rule that satisfies the new conditions. In this embodiment, dynamic regulatory manager 110 uses the trained model to generate a new rule that satisfies the additional information (e.g., different sets of context parameters, the weight for each of those parameters and target outputs). In this embodiment, a rule refers to a set of conditions and necessary actions for that condition. For example, there can be rules for a specific network topology when the network is running as intended. When something unexpected happens that interrupts the normal operations (e.g., if the network topology has changed due to one or more of the nodes being broken), dynamic regulatory manager 110 can create a new node and add that to the topology based on the new design and accordingly generate new rules that govern that specific interaction when those specific conditions are met. For example, dynamic regulatory manager 110 can generate a new rule for what will happen when a new node is added and the topology entirely changes, a new rule for what redundancy measures should be in place, what should be the latency threshold, etc. Dynamic regulatory manager 110 can specify these thresholds and other contextual parameters also changed on the fly. For this kind of change, where there are no specific rules but there are similar rules available, dynamic regulatory manager 110 can reference those similar rules, KPIs and thresholds and readjust and validate them as necessary.

In step 506, dynamic regulatory manager 110 creates a new workflow. In this embodiment, dynamic regulatory manager 110 creates a new workflow comprising one or more tasks, each task of the one or more tasks having respective one or more actions that are executed to fulfill the workflow. In this embodiment, dynamic regulatory manager 110 can utilize a generative artificial intelligence model to create a new workflow. Dynamic regulatory manager 110 then creates a mapping of the new workflow to the new rule and stores the mapping in a database (e.g., database 112).

Figure 6:
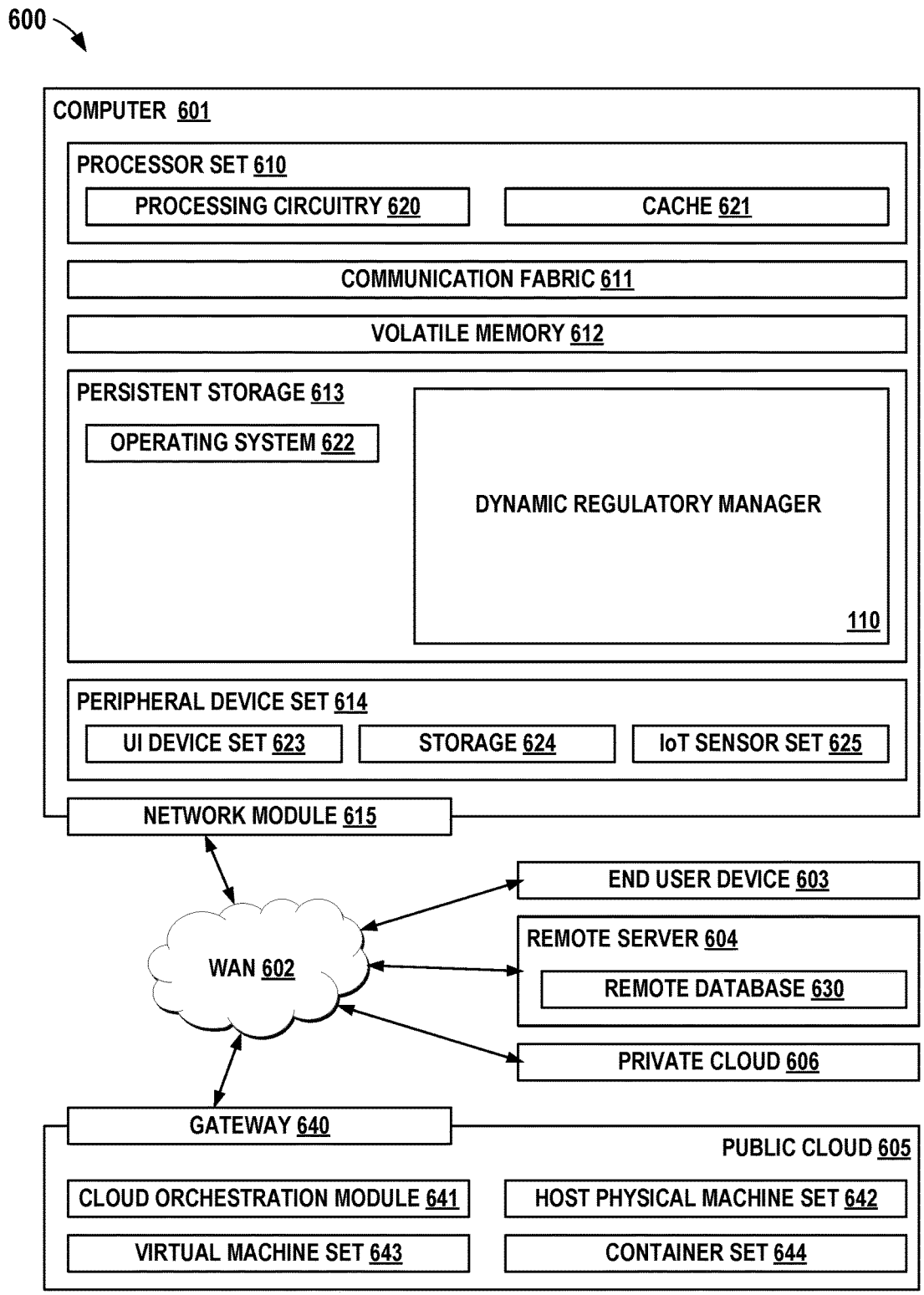
FIG. 6 is a block diagram of an alternate computing environment, in accordance with an embodiment of the present invention.

FIG. 6 depicts an alternate block diagram of components of computing systems within computing environment 100 of FIG. 1, in accordance with an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as dynamic regulatory manager 110 (also referred to as block 110) dynamically aggregates records for long transactions by generating a mechanism (e.g., an execution slot) to exclude identified performance data of long transactions from current aggregation, store the excluded performance data in memory, and subsequently retrieve the performance data as discussed previously with respect to FIGS. 2-5.

In addition to block 110, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 110, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 110 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 110 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers.

IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

What is claimed is:

1. A computer-implemented method comprising:
   collecting information associated with a target edge platform;
   generating a set of rules for the target edge platform for different situations that can occur on the target edge platform;
   in response to receiving additional information, dynamically adjusting the generated set of rules for the target platform;

in response to determining that a received request does not have a corresponding rule in the set of rules that matches the received request, identifying differences in the set of rules for a new scenario and a changed topology;
generating a new rule to address the new scenario and the changed topology;
generating a new workflow for the new rule, the new workflow including one or more tasks, each task of the one or more tasks having respective one or more actions being executed to fulfill the workflow;
creating a mapping of the new workflow to the new rule; and
storing the mapping in a database.

2. The computer-implemented method of claim 1, wherein information comprises:
context aware parameters for edge applications of the platform, network topology, environment policies, and device settings of devices connected to the platform.

3. The computer-implemented method of claim 2, further comprising:
storing collected context aware parameters for edge applications of the platform, the network topology, the environment policies, and the device settings of devices connected to the platform in a central data storage.

4. The computer-implemented method of claim 3, further comprising:
classifying the generated set of rules and the collected context aware parameters for the edge applications of the platform, the network topology, the environment policies, and the device settings of devices connected to the platform in the central data storage.

5. The computer-implemented method of claim 1, further comprising:
creating a workflow comprising one or more tasks, each task of the one or more tasks having respective one or more actions that can be executed to fulfill the workflow.

6. The computer-implemented method of claim 5, further comprising:
mapping the created workflow to the dynamically adjusted set of rules for the platform; and
storing the created workflow and the dynamically adjust set of rules for the platform in a central data storage.

7. The computer-implemented method of claim 1, further comprising:
assessing effects of the dynamically adjusted set of rules for the target platform.

8. A computer program product comprising:
one or more computer readable storage media and program instructions stored on the one or more computer readable storage media, the program instructions comprising:
program instructions to collect information associated with a target edge platform;
program instructions to generate a set of rules for the target edge platform for different situations that can occur on the target edge platform;
program instructions to, in response to receiving additional information, dynamically adjust the generated set of rules for the target platform;
program instructions to, in response to determining that a received request does not have a corresponding rule in the set of rules that matches the received request, program instructions to identify differences in the set of rules for a new scenario and a changed topology;
program instructions to generate a new rule to address the new scenario and the changed topology;
program instructions to generate a new workflow for the new rule, the new workflow including one or more tasks, each task of the one or more tasks having respective one or more actions being executed to fulfill the workflow;
program instructions to create a mapping of the new workflow to the new rule; and
program instructions to store the mapping in a database.

9. The computer program product of claim 8, wherein information comprises:
context aware parameters for edge applications of the platform, network topology, environment policies, and device settings of devices connected to the platform.

10. The computer program product of claim 9, wherein the program instructions stored on the one or more computer storage readable media further comprise:
program instructions to store collected context aware parameters for the edge applications of the platform, the network topology, the environment policies, and the device settings of devices connected to the platform in a central data storage.

11. The computer program product of claim 10, wherein the program instructions stored on the one or more computer storage readable media further comprise:
program instructions to classify the generated set of rules and the collected context aware parameters for the edge applications of the platform, the network topology, the environment policies, and the device settings of devices connected to the platform in the central data storage.

12. The computer program product of claim 8, wherein the program instructions stored on the one or more computer storage readable media further comprise:
program instructions to create a workflow comprising one or more tasks, each task of the one or more tasks having respective one or more actions that can be executed to fulfill the workflow.

13. The computer program product of claim 12, wherein the program instructions stored on the one or more computer storage readable media further comprise:
program instructions to map the created workflow to the dynamically adjusted set of rules for the platform; and
program instructions to store the created workflow and the dynamically adjust set of rules for the platform in a central data storage.

14. The computer program product of claim 8, wherein the program instructions stored on the one or more computer storage readable media further comprise:
program instructions to assess effects of the dynamically adjusted set of rules for the target platform.

15. A computer system comprising:
one or more computer processors;
one or more computer readable storage media; and
program instructions stored on the one or more computer readable storage media for execution by at least one of the one or more computer processors, the program instructions comprising:
program instructions to collect information associated with a target edge platform;
program instructions to generate a set of rules for the target edge platform for different situations that can occur on the target edge platform;
program instructions to, in response to receiving additional information, dynamically adjust the generated set of rules for the target platform;

program instructions to, in response to determining that a received request does not have a corresponding rule in the set of rules that matches the received request, program instructions to identify differences in the set of rules for a new scenario and a changed topology;

program instructions to generate a new rule to address the new scenario and the changed topology;

program instructions to generate a new workflow for the new rule, the new workflow including one or more tasks, each task of the one or more tasks having respective one or more actions being executed to fulfill the workflow;

program instructions to create a mapping of the new workflow to the new rule; and program instructions to store the mapping in a database.

16. The computer system of claim 15, wherein information comprises:

context aware parameters for edge applications of the platform, network topology, environment policies, and device settings of devices connected to the platform.

17. The computer system of claim 16, wherein the program instructions stored on the one or more computer storage readable media further comprise:

program instructions to store collected context aware parameters for the edge applications of the platform, the network topology, the environment policies, and the device settings of devices connected to the platform in a central data storage.

18. The computer system of claim 17, wherein the program instructions stored on the one or more computer storage readable media further comprise:

program instructions to classify the generated set of rules and the collected context aware parameters for the edge applications of the platform, the network topology, the environment policies, and the device settings of devices connected to the platform in the central data storage.

19. The computer system of claim 15, wherein the program instructions stored on the one or more computer storage readable media further comprise:

program instructions to create a workflow comprising one or more tasks, each task of the one or more tasks having respective one or more actions that can be executed to fulfill the workflow.

20. The computer system of claim 19, wherein the program instructions stored on the one or more computer storage readable media further comprise:

program instructions to map the created workflow to the dynamically adjusted set of rules for the platform; and program instructions to store the created workflow and the dynamically adjust set of rules for the platform in a central data storage.

\* \* \* \* \*